United States Patent [19]

Lindenfors

[11] 4,376,852
[45] Mar. 15, 1983

[54] PROCESS FOR PREPARING CELLULOSE PULP FILLER FOR THERMOSETTING RESIN MOLDING POWDERS

[75] Inventor: Sven G. Lindenfors, Domsjo, Sweden

[73] Assignee: Mooch Domsjo Aktiebolag, Ornskoldsvik, Sweden

[21] Appl. No.: 259,389

[22] Filed: May 1, 1981

[30] Foreign Application Priority Data

May 7, 1980 [SE] Sweden ............................ 8003406

[51] Int. Cl.³ ........................................... C08F 251/02
[52] U.S. Cl. ................... 527/314; 525/54.23; 525/54.3; 527/103; 527/312; 527/313; 527/400; 524/27; 524/13
[58] Field of Search .... 260/17 A, 17.4 GC, 17.4 UC, 260/17.4 CL, 17.5, 19 R, 21, 22 R; 527/314, 313, 103, 312, 400; 525/54.23, 54.3

[56] References Cited

U.S. PATENT DOCUMENTS

| | | | |
|---|---|---|---|
| 2,922,768 | 1/1960 | Mino et al. | 260/17 A |
| 3,044,972 | 7/1962 | Segro et al. | 260/17.4 GC |
| 3,046,078 | 7/1962 | Salsbury et al. | 260/17.4 GC |
| 3,083,118 | 3/1963 | Bridgeford | 260/17 A |
| 3,455,853 | 7/1969 | Dekking | 260/17 A |
| 3,457,198 | 7/1969 | Sobolev | 260/17.4 GC |
| 3,485,777 | 12/1969 | Gaylord | 260/17.4 GC |
| 4,026,849 | 5/1977 | Bagley et al. | 260/17.4 GC |

*Primary Examiner*—John Kight, III
*Assistant Examiner*—Nathan M. Nutter

[57] ABSTRACT

A process is provided for preparing a graft polymer-modified cellulose pulp filler from cellulose sulfite pulp having an $R_{18}$ value greater than 80%, which comprises adding to the pulp a redox initiator; washing the pulp with water having a pH below 5 in an amount sufficient to adjust the redox initiator cation content to within the range from about 5 to about 1000 ppm of cellulose sulfite pulp; adding hydrogen peroxide in an amount to provide within the range from about 0.1% to about 4% $H_2O_2$ by weight of the sulfite pulp; and then reacting the pulp with at least one monomer having the formula:

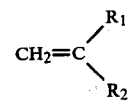

in which:
$R_1$ is hydrogen or methyl; and
$R_2$ is selected from the group consisting of nitrilo —CN,

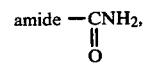

and $COOR_3$ groups, wherein $R_3$ is selected from the group consisting of methyl, ethyl, n-butyl, isobutyl and 2-ethylhexyl; at a temperature at which grafting of the monomer onto the cellulose polymer molecule proceeds but below about 70° C. for a time less than twelve hours under an inert atmosphere in a grafting ratio within the range from about 1 to about 40% and an average degree of polymerization within the range from about 20 to about 4000; and then recovering the graft polymer-modified cellulose sulfite pulp. The resulting cellulose pulp is adapted for use as a filler for thermosetting resins, imparting to the resins increased impact strength and structural strength, improved resistance to heat distortion and shrinkage, and decreased water absorptivity.

35 Claims, No Drawings

PROCESS FOR PREPARING CELLULOSE PULP FILLER FOR THERMOSETTING RESIN MOLDING POWDERS

Molding powders based on various types of thermosetting resins, for example, phenol-formaldehyde resins, melamine-formaldehyde resins, urea-formaldehyde resins, and unsaturated polyester resins, normally contain a filler, such as wood meal, cellulose, cellulose pulp, asbestos or glass fibers. The filler serves as an extender and bulking agent, and it also improves the properties of the product.

British Pat. No. 1,416,840 to Societa Italiana Resine S.I.R., for example, describes the preparation of aminoplast resins using purified cellulose pulp as a filler, the aminoplast resins being obtained by condensation of formaldehyde, possibly together with phenol, with urea, thiourea, melamine and/or dicyandiamide. The cellulose filler is impregnated with a syrup of the resin, the impregnated material homogenized with conventional additives, and the mixture then subjected to drying and granulation to form a molding powder.

Urea-formaldehyde resins give products with a high surface hardness, in this respect being superior to thermoplastic resins, and also with a high strength and rigidity. However, thermoplastic resins have a higher strength, particularly a higher impact strength. This is a problem which has been the subject of much research and experimentation, in an attempt to formulate improved urea-formaldehyde molding powders which give products that have the high strength properties of thermoplastic resins.

Another problem has been the thermal stability of the molding powder and the reaction product. Melamine-formaldehyde resins tend to be more stable than urea-formaldehyde resins, but they are also considerably more expensive.

In addition to heat stability, a further problem is shrinkage. Mold shrinkage is the difference in dimensions between the mold cavity of the cold pressing tool and the test piece at 20° C., the day after pressing.

After-shrinkage is the difference in dimensions between the test piece the day after the pressing, and the same test piece after 200 hours of heat treatment, either at a temperature corresponding to the temperatures which the molded piece is expected to encounter in use, or at a higher test temperature, in order to acclerate the shrinkage within the test time.

Mold shrinkage should be very small if the molding powder is to reproduce fine details of the mold, since only small variations can be permitted. After-shrinkage is a problem when a metal or other material of a different coefficient of expansion is to be inserted in the molded piece, or formed in situ as a part of the molded piece.

Melamine-formaldehyde molding powders are less susceptible to shrinkage than urea-formaldehyde molding powders, and the problem of decreasing shrinkage, both mold shrinkage and after-shrinkage, of urea-formaldehyde molding powders has also attracted much attention from urea-formaldehyde molding powder manufacturers.

In addition, water and moisture absorption of the molded product must be low, if the product is to be used in the electrical components field, for example, as electric contacts, lamp sockets, junction boxes and housings, and in electric tools. Here, also, melamine-formaldehyde molding powders are superior to urea-formaldehyde molding powders.

In accordance with the instant invention, it has been determined that the strength properties, shrinkage and water moisture absorption of urea-formaldehyde molding powders and similar thermosetting molding powders can be improved if as the filler for the molding powder there be used a cellulose pulp containing grafted nonionic synthetic graft polymers in a grafting ratio within the range from about 1 to about 40% and an average degree of polymerization within the range from about 20 to about 4000, the graft polymers being derived from monomers of the formula

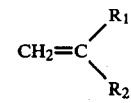

in which:
R$_1$ is hydrogen or methyl; and
R$_2$ is selected from the group consisting of nitrilo CN; amido —CONH$_2$; and COOR$_3$, in which R$_3$ is selected from the group consisting of methyl, ethyl, n-butyl, isobutyl and 2-ethylhexyl.

The process of the invention accordingly prepares a graft-polymer-modified cellulose pulp filler from cellulose sulfite pulp having an R$_{18}$ value greater than 80%, which comprises adding to the pulp a redox initiator; washing the pulp with water having a pH below 5 in an amount sufficient to adjust the redox initiator cation content to within the range from about 5 to about 1000 ppm of cellulose sulfite pulp; adding hydrogen peroxide in an amount to provide within the range from about 0.1% to about 4% H$_2$O$_2$ by weight of the cellulose sulfite pulp; and then reacting the pulp with at least one monomer having the formula:

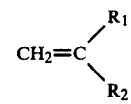

in which:
R$_1$ is hydrogen or methyl; and
R$_2$ is selected from the group consisting of nitrilo —CN;

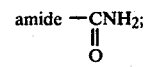

amide —CNH$_2$;
         ‖
         O and COOR$_3$ groups, wherein R$_3$ is selected from the group consisting of methyl, ethyl, n-butyl, isobutyl and 2-ethylhexyl;

at a temperature at which grafting of the monomer onto the cellulose polymer molecule proceeds but below about 70° C. for a time less than twelve hours under an inert atmosphere in a grafting ratio within the range from about 1 to about 40% and an average degree of polymerization within the range from about 20 to about 4000; and then recovering the graft polymer-modified cellulose sulfite pulp. The resulting cellulose pulp is adapted for use as a filler for thermosetting resins, imparting to the resins increased impact strength and structural strength, improved resistance to heat distortion and shrinkage, and decreased water absorptivity.

Exemplary monomers include acrylonitrile, acrylamide, methacrylonitrile, methacrylamide, ethyl acrylate, methyl acrylate, methyl methacrylate, ethyl methacrylate, and 2-ethylhexyl acrylate.

The grafted cellulose pulp is based on a cellulose sulfite pulp having an $R_{18}$ value greater than 80%.

Such graft polymer-modified cellulose sulfite pulps in admixture with thermosetting resin such as urea-formaldehyde, melamine-formaldehyde, phenol-formaldehyde, unsaturated polyesters, alcohol modified urea-formaldehyde, phenol-modified urea-formaldehyde and other thermosetting resins in a partially polymerized stage, capable of polymerization to a thermoset or non-thermoplastic stage, give molding powders which can be molded to form thermoset polymers having a higher impact strength, a higher flexural strength, and a higher heat distortion temperature, as well as a lower mold shrinkage, a lower-after shrinkage, and a lower water absorption, than similar polymers containing a non-grafted or unmodified cellulose sulfite pulp filler.

Cellulose sulfite pulp is used because it appears to have more favorable reactive sites for accepting graft polymer groups than other pulps, such as sulfate pulp or groundwood pulp. Control of the graft polymerization, including the grafting ratio and the degree of polymerization, is better, and so is susceptibility to initiation sensitization.

The graft polymer-modified cellulose sulfite pulp filler of the invention can be unbleached, or partially or fully bleached before or after graft-polymerization.

The graft polymerization is carried out according to conventional graft-polymerization techniques, sensitizing the pulp for grafting by treating the pulp with a redox initiator, such as, for example a $Ce^{4+}$, $Mn^{3+}$ or $Fe^{2+}$ grafting initiator, followed by reaction with hydrogen peroxide as the oxidizing agent, referred to as a cerium/peroxide, manganese/peroxide or iron/peroxide redox system. However, the process differs from conventional graft-polymerization in that the amount of redox initiator is from 1/10 to 1/20 the amount conventionally used for graft-polymerization, and is controlled to below 1000 ppm of pulp by washing the cellulose sulfite pulp with water having a pH below about 5 before addition of the peroxide. In this way, the initiator content of the finished pulp is reduced as much as possible.

In addition, the starting cellulose sulfite pulp has an $R_{18}$ value greater than 80%. The term "$R_{18}$ value" is defined as the pulp residue in percent, based on the weight of the initial pulp, after treatment with an 18% sodium hydroxide solution, and is accordingly a measure of alkali resistance of the pulp, and thus a gauge of the susceptibility of the pulp to accept graft polymer groups.

The grafting of vinyl monomers onto cellulose by the use of tetravalent cerium and ferrous iron ion redox initiators is described in the literature, for example, *Journal of Applied Polymer Science*, 17 3143–3156 (1973); 23 2425–2434 (1979). The graft polymerization is carried out in an inert atmosphere in the presence of an aqueous solution of the initiator at a low reaction temperature, approximately ambient, or slightly above. The relatively large amounts of redox initiator conventionally used, however, 100% by weight of $Fe^{2+}$, and 30% by weight of hydrogen peroxide, based on the pulp, are not economic in a commercial process, nor do they result in the desired improved properties of the cellulose pulp.

In the grafting process in accordance with the invention, the cellulose sulfite pulp is impregnated with an aqueous solution of the redox initiator, a polyvalent metal cation such as, for example, $Ce^{4+}$, $Mn^{3+}$, or $Fe^{2+}$, followed by washing with acidified water having a pH of less than 5, and preferably below 3.5, to reduce the cation concentration in the pulp to less than 1000 ppm and preferably less than 300 ppm of pulp. This amount of cation initiator is considerably less than the conventional amount used for grafting polymerization of cellulose pulp. The cation initiator can be added in the form of an aqueous solution of a water-soluble compound thereof, such as the oxide, hydroxide, hydrous oxide, or salt, of cerium $Ce^{4+}$, manganese $Mn^{3+}$, or $Fe^{2+}$, providing this cation in solution. If a salt is used, the anion should not be deleterious, and it preferably is one already present as a result of a pulping or pulp treating process, such as sulfite or chloride.

The washing of the treated pulp with acidified water having a pH below about 5 and preferably below about 3.5 can be carried out in conventional pulp-washing equipment, such as rotating drum washers with water spray heads, and is repeated enough times to reduce the content of the initiator cation to within the desired range for the initiation.

Following the washing, the oxidizing agent is added. This is normally in the form of dilute aqueous hydrogen peroxide solution, which is added in an amount sufficient to provide $H_2O_2$ in an amount at least about 0.1% but below about 4%, and preferably below about 1.5%, based on the weight of the cellulose pulp.

Then, the monomer is added. One or a mixture of two or more monomers can be used. Chemically pure monomer is preferably used, but if the monomer is hard to handle, the monomer can also be added in the form of a solution thereof in an inert solvent, preferably water, or a water-miscible alcohol, ketone or ether.

The reaction mixture then is held at the selected reaction temperature, which is below about 70° C. and preferably below about 50° C., but is at least 10° C. and usually at or slightly above ambient temperature, 20° to 30° C. The reaction proceeds under a substantially inert, i.e., oxygen-free, atmosphere, such as nitrogen, carbon dioxide, argon or helium, and is normally complete in about twelve hours. Preferably, the reaction temperature is so selected that the reaction time is less than four hours.

The reaction is exothermic, and normally after the reaction has begun no heating is required. It may even be necessary to cool the reaction mixture, in order to maintain a temperature below the selected temperature, and in any case below about 70° C.

The reaction parameters, i.e., the redox initiator and amount, the monomer and the amount, the reaction temperature, and the reaction time, are so selected that the grafting ratio of monomer added or reacted onto the cellulose pulp is within the range from about 1 to about 40%. The grafting ratio is represented by the formula:

$$\frac{A-B}{B} \cdot 100$$

where

A is the weight of reaction product, the graft polymer-modified cellulose sulfite pulp; and B is the weight of the starting material, the unmodified cellulose sulfite pulp.

By choice of these reaction parameters, an average degree of polymerization within the desired range, from about 20 to about 4000, is obtained for the graft polymer added or reacted onto the cellulose sulfite pulp.

To determine the ratio F of the amount of starting cellulose sulfite pulp B and the amount of monomer M added at the start of the grafting reaction in order to obtain a desired grafting ratio, the following equations are used:

$$F = B/M \qquad (1)$$

$$A = B + u \cdot M \qquad (2)$$

in which

F is a variable depending on B and M; and
u is the part of the monomer which has been grafted onto the cellulose.

The grafting ratio I in percent is then $$I = \frac{B + u(M) - F(M)}{F(M)} \times 100 \text{ and } F = \frac{100 \, u}{I} \qquad (3)$$

The part of the monomer grafted onto the cellulose, u, can be estimated by a person skilled in the art, or determined by preliminary tests. It should be kept as close to unity as possible, and usually has a value within the range from about 0.5 to about 0.9.

When the grafting ratio I varies between 1 and 40%, F is within the range from 1.25 to 50, when u is 0.5, and from 2.25 to 90 when u is 0.9.

Any sulfite pulp can be employed, whether unbleached or partially or fully bleached before the graft polymerization. An unbleached pulp can be bleached following the graft polymerization. The graft polymer-modified cellulose sulfite pulp is washed, and then bleached using conventional bleaching agents, such as chlorine, alkali, hypochlorite and chlorine dioxide, without adversely affecting the desirable properties of the product.

An especially suitable sulfite pulp is the unbleached pulp prepared according to the two-stage sulfite digestion process. Such pulps are first pulped at a pH of from 5 to 7, in a first stage, and then at a pH of from 1 to 3 in a second stage. These pulps have an especially advantageous content of galactose, pentosans and glucomannans.

The starting cellulose sulfite pulp can be used in dried or undried form, and may contain any amount of lignocellulosic material or lignin. When the amount of lignin is greater than about 0.3%, however, $Ce^{4+}$ ion is not satisfactory as an initiator while $Fe^{2+}$ is. In fact, the $Fe^{2+}/H_2O_2$ redox initiator system is also effective at lignin contents below about 0.3%. The $Fe^{2+}$/peroxide system can also initiate grafting on totally unbleached pulps, which is a further advantage, since some molding powders can be in a dark color, therefore making it possible to use as a filler cellulose pulp that has not been bleached. A further advantage of the $Fe^{2+}/H_2O_2$ redox initiator system is that hydrogen peroxide is commonly used in pulp manufacture, and is therefore readily available in a pulp mill at a low cost, and does not introduce foreign cations, unlike redox initiator systems using $Ce^{4+}$ or $Mn^{3+}$ initiator cations. Accordingly, the $Fe^{2+}/H_2O_2$ redox initiator system is preferred for use in the invention.

The graft polymer-modified cellulose sulfite pulp can be used as a filler in molding powders based on various types of thermosetting resins, for example, phenol-formaldehyde resins, melamine-formaldehyde resins, urea-formaldehyde resins, and unsaturated polyester resins. Such powders normally contain a filler from about 0.5 to about 50% by weight of the resin of a filler. In addition to the cellulose pulp of the invention, there can also be added conventional fillers such as wood meal, cellulose, asbestos or glass fibers. Other adjuncts such as stabilizers, antioxidants, curing accelerators and pigments also can be added.

The thermosetting resin is usually combined in a liquid or syrup form with the filler which is impregnated with the liquid resin, the impregnated material homogenized with any other conventional additives, and then subjected to drying and granulation to form a molding powder.

The following Examples represent preferred embodiments of the invention:

EXAMPLE 1

A two-stage pulp was prepared by treatment first with an aqueous sodium sulfite pulping liquor at pH 6.4 and 150° C. for one-half hour, and then with an aqueous sodium sulfite pulping liquor at pH 1.5 at 135° C. for 2.5 hours. 20 kilograms of the resulting undried cellulose sulfite pulp, which had an $R_{18}$ value of 90%, was impregnated in a reactor with 1.4 kilograms of $(NH_4)_2Fe(SO_4)_2.6H_2O$ dissolved in 480 liters of water for fifteen minutes with stirring. The pulp was then dewatered and washed with water acidified to a pH of 3.0 until the amount of iron present was 250 ppm based on the dry cellulose sulfite pulp.

The reactor was preheated to about 40° C., and there was then added 0.6 kilogram of hydrogen peroxide, based on 100% $H_2O_2$, dissolved in 270 liters of water, and 6 kilograms of acrylamide, dissolved in 40 liters of water. Reaction was continued at 40° C. for 3.5 hours under an inert nitrogen atmosphere. The resulting pulp was then washed, dried, and subjected to a light mechanical working, which gave the product a fluffy character.

Kjeldahl analysis showed a nitrogen content of 3.0%, which corresponded to a grafting ratio of 18%. The average degree of polymerization of the chemically bound polyacrylamide was determined to be about 400 by means of hydrolysis in aqueous 1 molar sulfuric acid, and determination of the molecular weight of the polyacrylamide by viscosity measurement.

1.95 kilograms of solid urea was dissolved in aqueous formaldehyde solution containing 1.55 kilograms of formaldehyde neutralized to pH 8.5. The reaction mixture was kept at about 50° C. until the viscosity of the resin solution was satisfactory. The hot resin solution was then transferred to a vessel equipped with an agitator and 1 kilogram of the graft polymer-modified cellulose sulfite pulp, prepared as described above, was added in increments, with stirring. The resulting product was dried and ground first in a hammer mill, and finally in a ball mill.

In this Example, the values for the Formulae (1), (2) and (3) above were as follows:
I = 18%
A = 23.2 kilograms
u = 0.6
F = 20 kilograms
M = 6 kilograms For comparison, another portion of the same starting material, the unmodified undried two-stage cellulose sulfite pulp, was mixed with the same urea-formaldehyde resin solution, and converted to a molding powder in the same way as described above.

Test pieces of each molding powder were then prepared by compression molding, and the resulting molded products were tested for impact strength, flexural strength, heat distortion temperature, mold shrinkage, after-shrinkage and water absorptivity, according to the test standards indicated in Table I below, which lists the values for these properties obtained as a ratio R of the values for that property of Product A, produced from the molding powder in accordance with the invention, and of Product B, produced from the molding powder with untreated cellulose sulfite pulp.

A ratio R greater than 1 for the impact strength, flexural strength and heat distortion temperature represents an improvement, and a ratio R of less than 1 for mold shrinkage, after-shrinkage, and water absorption shows an improvement.

The following values were obtained:

TABLE I

| Property | $R = \frac{A}{B}$ |
|---|---|
| Impact strength DIN 53 435 | 1.3 |
| Flexural strength DIN 43 452 | 1.4 |
| Heat distortion temperature DIN 53 458 | 1.2 |
| Mold shrinkage SIS 200301 | 0.6 |
| After-shrinkage DIN 53 464 | 0.5 |
| Water absorption DIN 53 472 | 0.7 |

EXAMPLE 2

A two-stage pulp was prepared by treatment first with an aqueous sodium sulfite pulping liquor at pH 6.4 and 150° C. for one-half hour, and then with an aqueous sodium sulfite pulping liquor at pH 1.5 at 135° C. for 2.5 hours. 20 kilograms of the resulting undried cellulose sulfite pulp, which had an $R_{18}$ value of 90%, was impregnated in a reactor with 1.4 kilograms of $(NH_4)_2Fe(SO_4)_2.6H_2O$ dissolved in 480 liters of water for fifteen minutes with stirring. The pulp was then dewatered and washed with water acidified to a pH of 3.0 until the amount of iron present was 250 ppm based on the dry cellulose sulfite pulp.

The reactor was preheated to about 40° C., and there was then added 0.6 kilogram of hydrogen peroxide, based on 100% $H_2O_2$, dissolved in 270 liters of water, and 5.8 kilograms of acrylonitrile, dissolved in 40 liters of water. Reaction was continued at 40° C. for 3.5 hours under an inert nitrogen atmosphere. The resulting pulp was then washed, dried, and subjected to a light mechanical working, which gave the product a fluffy character.

1.95 kilograms of solid urea was dissolved in aqueous formaldehyde solution containing 1.55 kilograms of formaldehyde neutralized to pH 8.5. The reaction mixture was kept at about 50° C. until the viscosity of the resin solution was satisfactory. The hot resin solution was then transferred to a vessel equipped with an agitator and 1 kilogram of the graft polymer-modified cellulose sulfite pulp, prepared as described above, was added in increments, with stirring. The resulting product was dried and ground first in a hammer mill, and finally in a ball mill.

In this Example, the values for the Formulae (1), (2) and (3) above were as follows:

I = 18%
A = 23.2 kilograms
u = 0.6
F = 20 kilograms
M = 6 kilograms

For comparison, another portion of the same starting material, the unmodified undried two-stage cellulose sulfite pulp, was mixed with the same urea-formaldehyde resin solution, and converted to a molding powder in the same way as described above.

Test pieces of each molding powder were then prepared by compression molding, and the resulting molded products were tested for impact strength, flexural strength, heat distortion temperature, mold shrinkage, after-shrinkage and water absorptivity, according to the test standards indicated in Table I below, which lists the values for these properties obtained as a ratio R of the values for that property of Product A, produced from the molding powder in accordance with the invention, and of Product B, produced from the molding powder with untreated cellulose sulfite pulp.

A ratio R greater than 1 for the impact strength, flexural strength and heat distortion temperature represents an improvement, and a ratio R of less than 1 for mold shrinkage, after-shrinkage, and water absorption shows an improvement.

TABLE II

| Property | $R = \frac{A}{B}$ |
|---|---|
| Impact strength DIN 53 435 | >1 |
| Flexural strength DIN 43 452 | >1 |
| Heat distortion temperature DIN 53 458 | >1 |
| Mold shrinkage SIS 200301 | <1 |
| After-shrinkage DIN 53 464 | <1 |
| Water absorption DIN 53 472 | <1 |

EXAMPLE 3

A two-stage pulp was prepared by treatment first with an aqueous sodium sulfite pulping liquor at pH 6.4 and 150° C. for one-half hour, and then with an aqueous sodium sulfite pulping liquor at pH 1.5 at 135° C. for 2.5 hours. 20 kilograms of the resulting undried cellulose sulfite pulp, which had an $R_{18}$ value of 90%, was impregnated in a reactor with 1.4 kilograms of $(NH_4)_2Fe(SO_4)_2.6H_2O$ dissolved in 480 liters of water for fifteen minutes with stirring. The pulp was then dewatered and washed with water acidified to a pH of 3.0 until the amount of iron present was 250 ppm based on the dry cellulose sulfite pulp.

The reactor was preheated to about 40° C., and there was then added 0.6 kilogram of hydrogen peroxide, based on 100% $H_2O_2$, dissolved in 270 liters of water, and 6 kilograms of methyl acrylate, dissolved in 40 liters of water. Reaction was continued at 40° C. for 3.5 hours under an inert nitrogen atmosphere. The resulting pulp was then washed, dried, and subjected to a light mechanical working, which gave the product a fluffy character.

1.95 kilograms of solid urea was dissolved in aqueous formaldehyde solution containing 1.55 kilograms of formaldehyde neutralized to pH 8.5. The reaction mixture was kept at about 50° C. until the viscosity of the resin solution was satisfactory. The hot resin solution was then transferred to a vessel equipped with an agitator and 1 kilogram of the graft polymer-modified cellulose sulfite pulp, prepared as described above, was added in increments, with stirring. The resulting product was dried and ground first in a hammer mill, and finally in a ball mill.

In this Example, the values for the Formulae (1), (2) and (3) above were as follows:
I = 18%
A = 23.2 kilograms
u = 0.6
F = 20 kilograms
M = 6 kilograms For comparison, another portion of the same starting material, the unmodified undried two-stage cellulose sulfite pulp, was mixed with the same urea-formaldehyde resin solution, and converted to a molding powder in the same way as described above.

Test pieces of each molding powder were then prepared by compression molding, and the resulting molded products were tested for impact strength, flexural strength, heat distortion temperature, mold shrinkage, after-shrinkage and water absorptivity, according to the test standards indicated in Table I below, which lists the values for these properties obtained as a ratio R of the values for that property of Product A, produced from the molding powder in accordance with the invention, and of Product B, produced from the molding powder with untreated cellulose sulfite pulp.

A ratio R greater than 1 for the impact strength, flexural strength and heat distortion temperature represents an improvement, and a ratio R of less than 1 for mold shrinkage, after-shrinkage, and water absorption shows an improvement.

TABLE III

| Property | $R = \frac{A}{B}$ |
|---|---|
| Impact strength DIN 53 435 | >1 |
| Flexural strength DIN 43 452 | >1 |
| Heat distortion temperature DIN 53 458 | >1 |
| Mold shrinkage SIS 200301 | <1 |
| After-shrinkage DIN 53 464 | <1 |
| Water absorption DIN 53 472 | <1 |

EXAMPLE 4

A two-stage pulp was prepared by treatment first with an aqueous sodium sulfite pulping liquor at pH 6.4 and 150° C. for one-half hour, and then with an aqueous, sodium sulfite pulping liquor at pH 1.5 at 135° C. for 2.5 hours. 20 kilograms of the resulting undried cellulose sulfite pulp, which had an $R_{18}$ value of 90%, was impregnated in a reactor with 1.4 kilograms of $(NH_4)_2Fe(SO_4)_2 \cdot 6H_2O$ dissolved in 480 liters of water for fifteen minutes with stirring. The pulp was then dewatered and washed with water acidified to a pH of 3.0 until the amount of iron present was 250 ppm based on the dry cellulose sulfite pulp.

The reactor was preheated to about 40° C., and there was then added 0.6 kilogram of hydrogen peroxide, based on 100% $H_2O_2$, dissolved in 270 liters of water, and 8 kilograms of 2-ethylhexylacrylate, dissolved in 40 liters of water. Reaction was continued at 40° C. for 3.5 hours under an inert nitrogen atmosphere. The resulting pulp was then washed, dried, and subjected to a light mechanical working, which gave the product a fluffy character.

1.95 kilograms of solid urea was dissolved in aqueous formaldehyde solution containing 1.55 kilograms of formaldehyde neutralized to pH 8.5. The reaction mixture was kept at about 50° C. until the viscosity of the resin solution was satisfactory. The hot resin solution was then transferred to a vessel equipped with an agitator and 1 kilogram of the graft polymer-modified cellulose sulfite pulp, prepared as described above, was added in increments, with stirring. The resulting product was dried and ground first in a hammer mill, and finally in a ball mill.

In this Example, the values for the Formulae (1), (2) and (3) above were as follows:
I = 18%
A = 23.2 kilograms
u = 0.6
F = 20 kilograms
M = 6 kilograms For comparison, another portion of the same starting material, the unmodified undried two-stage cellulose sulfite pulp, was mixed with the same urea-formaldehyde resin solution, and converted to a molding powder in the same way as described above.

Test pieces of each molding powder were then prepared by compression molding, and the resulting molded products were tested for impact strength, flexural strength, heat distortion temperature, mold shrinkage, after-shrinkage and water absorptivity, according to the test standards indicated in Table I below, which lists the values for these properties obtained as a ratio R of the values for that property of Product A, produced from the molding powder in accordance with the invention, and of Product B, produced from the molding powder with untreated cellulose sulfite pulp.

A ratio R greater than 1 for the impact strength, flexural strength and heat distortion temperature represents an improvement, and a ratio R of less than 1 for mold shrinkage, after-shrinkage, and water absorption shows an improvement.

TABLE IV

| Property | $R = \frac{A}{B}$ |
|---|---|
| Impact strength DIN 53 435 | >1 |
| Flexural strength DIN 43 452 | >1 |
| Heat distortion temperature DIN 53 458 | >1 |
| Mold shrinkage SIS 200301 | <1 |
| After-shrinkage DIN 53 464 | <1 |
| Water absorption DIN 53 472 | <1 |

Having regard to the foregoing disclosure, the following is claimed as the patentable and inventive embodiments thereof:

1. A process for preparing a graft polymer-modified cellulose pulp filler from cellulose sulfite pulp having an $R_{18}$ value greater than 80%, which comprises adding to the pulp a redox initiator; washing the pulp with water having a pH below 5 in an amount sufficient to adjust the redox initiator cation content to within the range from about 5 to about 1000 ppm of cellulose sulfite pulp; adding hydrogen peroxide in an amount to provide within the range from about 0.1% to about 4% $H_2O_2$ by weight of the sulfite pulp; and then reacting the pulp with at least one monomer having the formula:

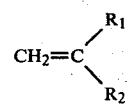

in which:
$R_1$ is hydrogen or methyl; and

R₂ is selected from the group consisting of nitrilo—CN,

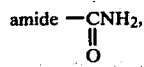

and COOR₃ groups, wherein R₃ is selected from the group consisting of methyl, ethyl, n-butyl, isobutyl and 2-ethylhexyl;

at a temperature at which grafting of the monomer onto the cellulose polymer molecule proceeds but below about 70° C. for a time less than twelve hours under an inert atmosphere, the monomer being added in an amount sufficient to provide a grafting ratio within the range from about 1 to about 40% and an average degree of polymerization within the range from about 20 to about 4000; and then recovering the graft polymer-modified cellulose sulfite pulp.

2. A process according to claim 1 in which the monomer is acrylamide.

3. A process according to claim 1 in which the monomer is acrylonitrile.

4. A process according to claim 1 in which the monomer is methyl acrylate.

5. A process according to claim 1 in which the monomer is ethylhexyl acrylate.

6. A process according to claim 1 in which the cellulose sulfite pulp is prepared by a one-stage sulfite digestion process.

7. A process according to claim 1 in which the cellulose sulfite pulp is prepared by a two-stage sulfite digestion process.

8. A process according to claim 1 in which the temperature is within the range from about 10° to about 50° C.

9. A process according to claim 1 in which the redox initiator comprises $Fe^{2+}/H_2O_2$.

10. A process according to claim 1 in which the redox initiator comprises $Ce^{4+}/H_2O_2$.

11. A process according to claim 1 in which the redox initiator comprises $Mn^{3+}/H_2O_2$.

12. A process according to claim 1 which comprises bleaching the graft polymer-modified pulp with a chlorine-containing bleaching agent selected from the group consisting of chlorine, chlorine dioxide and hypochlorite.

13. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 1.

14. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 2.

15. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 3.

16. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 4.

17. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 5.

18. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 6.

19. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 7.

20. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 8.

21. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 9.

22. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 10.

23. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 11.

24. A molding powder comprising a thermosetting resin selected from the group consisting of urea-formaldehye, melamine-formaldehyde, phenol-formaldehyde and unsaturated polyester and, as a filler, a graft-polymer-modified cellulose sulfite pulp prepared according to the process of claim 1.

25. A molding powder comprising a thermosetting resin selected from the group consisting of urea-formaldehyde, melamine-formaldehyde, phenol-formaldehyde and unsaturated polyester and, as a filler, a graft-polymer-modified cellulose sulfite pulp prepared according to the process of claim 2.

26. A molding powder comprising a thermosetting resin selected from the group consisting of urea-formaldehyde, melamine-formaldehyde, phenol-formaldehyde and unsaturated polyester and, as a filler, a graft-polymer-modified cellulose sulfite pulp prepared according to the process of claim 3.

27. A molding powder comprising a thermosetting resin selected from the group consisting of urea-formaldehyde, melamine-formaldehyde, phenol-formaldehyde and unsaturated polyester and, as a filler, a graftpolymer-modified cellulose sulfite pulp prepared according to the process of claim 4.

28. A molding powder comprising a thermosetting resin selected from the group consisting of urea-formaldehyde, melamine-formaldehyde, phenol-formaldehyde and unsaturated polyester and, as a filler, a graft-polymer-modified cellulose sulfite pulp prepared according to the process of claim 5.

29. A molding powder comprising a thermosetting resin selected from the group consisting of urea-formaldehyde, melamine-formaldehyde, phenol-formaldehyde and unsaturated polyester and, as a filler, a graft-polymer-modified cellulose sulfite pulp prepared according to the process of claim 6.

30. A molding powder comprising a thermosetting resin selected from the group consisting of urea-formaldehyde, melamine-formaldehyde, phenol-formaldehyde and unsaturated polyester and, as a filler, a graft-polymer-modified cellulose sulfite pulp prepared according to the process of claim 7.

31. A molding powder comprising a thermosetting resin selected from the group consisting of urea-formaldehyde, melamine-formaldehyde, phenol-formaldehyde and unsaturated polyester and, as a filler, a graft-polymer-modified cellulose sulfite pulp prepared according to the process of claim 8.

32. A molding powder comprising a thermosetting resin selected from the group consisting of urea-formaldehyde, melamine-formaldehyde, phenol-formaldehyde and unsaturated polyester and, as a filler, a graft-polymer-modified cellulose sulfite pulp prepared according to the process of claim 9.

33. Cellulose sulfite pulp adapted for use as a filler for thermosetting resins, imparting to the resins increased impact strength and structural strength, improved resistance to heat distortion and shrinkage, and decreased water absorptivity, and prepared according to the process of claim 10.

34. A molding powder comprising a thermosetting resin selected from the group consisting of urea-formaldehyde, melamine-formaldehyde, phenol-formaldehyde and unsaturated polyester and, as a filler, a graft-polymer-modified cellulose sulfite prepared according to the process of claim 11.

35. A molding powder comprising a thermosetting resin selected from the group consisting of urea-formaldehyde, melamine-formaldehyde, phenol-formaldehyde and unsaturated polyester and, as a filler, a graft-polymer-modified cellulose sulfite prepared according to the process of claim 12.

* * * * *